(12) United States Patent
Smith et al.

(10) Patent No.: US 12,487,207 B2
(45) Date of Patent: Dec. 2, 2025

(54) SHOCK WAVE SIGNAL GENERATOR AND METHODS OF USE THEREOF

(71) Applicant: Seal Water Technology Ltd., Snodland (GB)

(72) Inventors: William Smith, Moggill (AU); Ying Li, Moggill (AU); Duncan Hywel-Evans, Mundoolun (AU)

(73) Assignee: Seal Water Technology Ltd., Snodland (GB)

( * ) Notice: Subject to any disclaimer, the term of this patent is extended or adjusted under 35 U.S.C. 154(b) by 408 days.

(21) Appl. No.: 18/041,552

(22) PCT Filed: Aug. 18, 2021

(86) PCT No.: PCT/AU2021/050907
§ 371 (c)(1),
(2) Date: Feb. 14, 2023

(87) PCT Pub. No.: WO2022/036396
PCT Pub. Date: Feb. 24, 2022

(65) Prior Publication Data
US 2023/0304971 A1 Sep. 28, 2023

Related U.S. Application Data

(63) Continuation of application No. 16/995,955, filed on Aug. 18, 2020, now abandoned.

(30) Foreign Application Priority Data

Oct. 8, 2020 (AU) ............................. 2020903647

(51) Int. Cl.
*G01N 29/34* (2006.01)
*G01N 29/02* (2006.01)
*G01N 29/44* (2006.01)

(52) U.S. Cl.
CPC ............ *G01N 29/34* (2013.01); *G01N 29/02* (2013.01); *G01N 29/44* (2013.01)

(58) Field of Classification Search
CPC ......... G01N 29/34; G01N 29/02; G01N 29/44
See application file for complete search history.

(56) References Cited

U.S. PATENT DOCUMENTS 3,028,830 A * 4/1962 Grundmann ........... G10K 1/072
116/DIG. 30
3,112,486 A * 11/1963 Adler ....................... H03J 1/22
367/133

(Continued)

FOREIGN PATENT DOCUMENTS

| CN | 2158031 Y | 3/1994 |
| CN | 109084185 B | 8/2019 |

(Continued)

OTHER PUBLICATIONS

Supplementary European Search Report mailed on Aug. 9, 2024 in EP 21857039.8.

*Primary Examiner* — Paul M. West
(74) *Attorney, Agent, or Firm* — Fox Rothschild LLP

(57) ABSTRACT

A shock wave signal generator is disclosed together with a system and methods of using the shock wave signal generator to identify and locate anomalies in a fluid medium. In one form, the shock wave signal generator includes a striker and a resonator operatively associated with a fluid medium. The resonator is configured to resonate when struck by the striker and emit a supersonic pulse that introduces at least one said shock wave signal into the fluid medium.

20 Claims, 11 Drawing Sheets

(56) References Cited

U.S. PATENT DOCUMENTS

| | | | | |
|---|---|---|---|---|
| 3,750,131 | A | * | 7/1973 | Fletcher ............... G08B 25/016 |
| | | | | 340/531 |
| 4,142,478 | A | * | 3/1979 | Husman ................ G10K 1/067 |
| | | | | 116/169 |
| 2002/0035437 | A1 | | 3/2002 | Tingley |
| 2012/0047871 | A1 | | 3/2012 | Horn et al. |
| 2019/0310364 | A1 | | 10/2019 | Martin et al. |

FOREIGN PATENT DOCUMENTS

| | | |
|---|---|---|
| GB | 2191860 B | 1/1991 |
| JP | H03170161 A | 7/1991 |
| JP | 2017090335 A | 5/2017 |
| KR | 20150071392 A | 6/2015 |
| WO | 2020040800 A1 | 2/2020 |

* cited by examiner

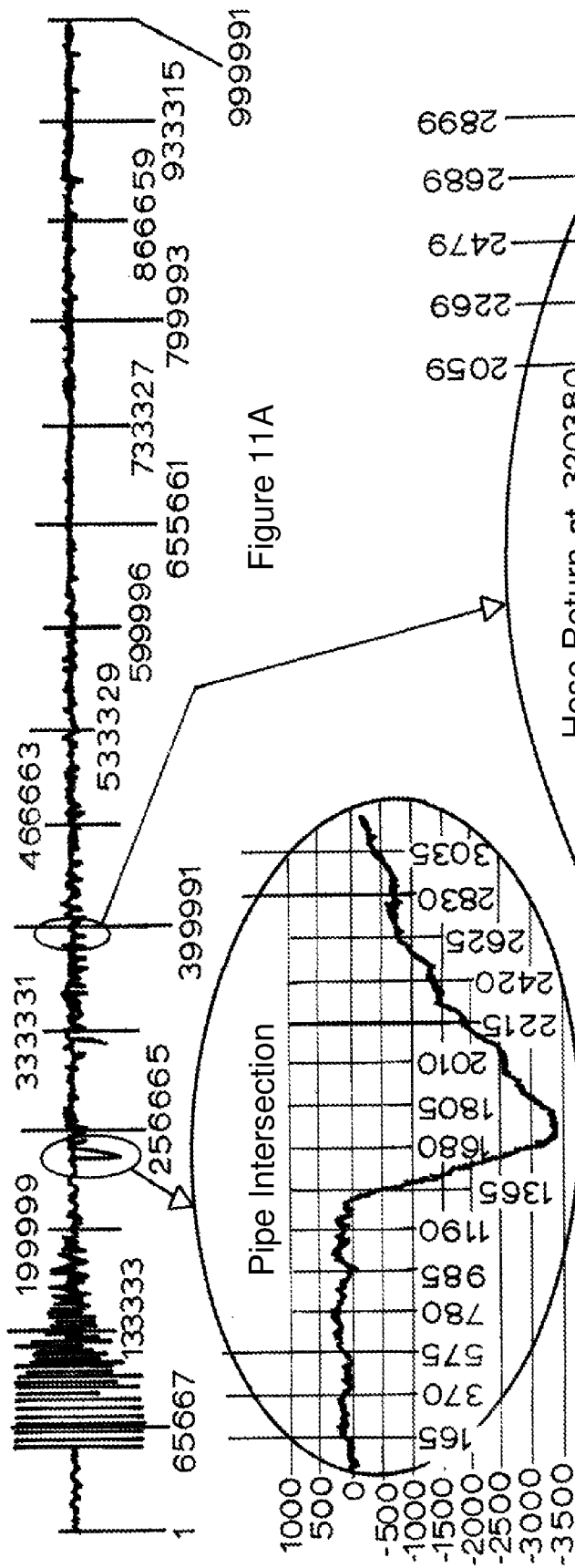
Figure 11A
Figure 11B
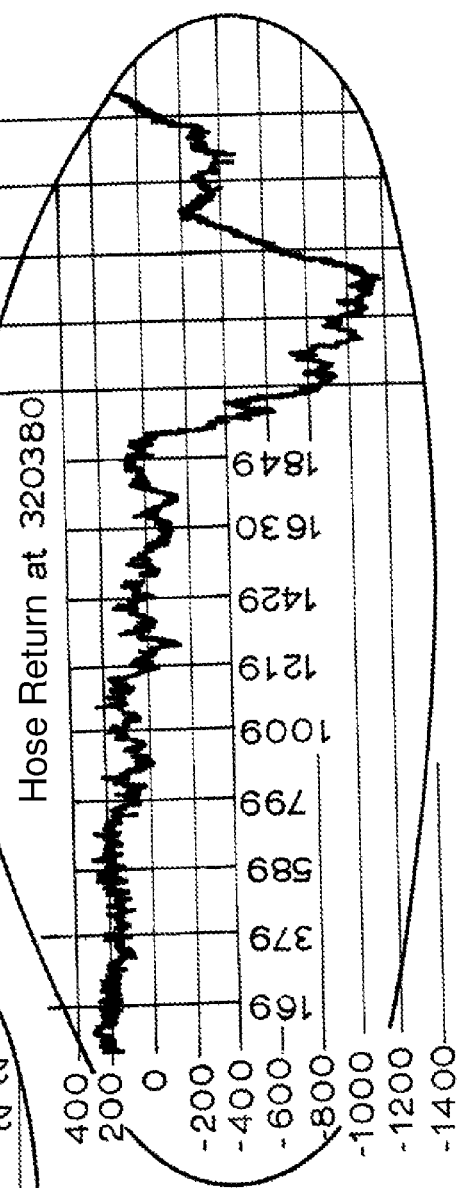
Figure 11C

SHOCK WAVE SIGNAL GENERATOR AND METHODS OF USE THEREOF

CROSS-REFERENCE TO RELATED APPLICATIONS

This application is the U.S. national phase of International Patent Application No. PCT/AU2021/050907, filed on Aug. 18, 2021, which claims priority to U.S. patent application Ser. No. 16/995,955, filed on Aug. 18, 2020 and Australian Patent Application No. 2020903647, filed on Oct. 8, 2020, the contents of which are incorporated herein by reference in their entirety.

TECHNICAL FIELD

The present invention relates to a shock wave signal generator for introducing a shock wave signal into a fluid medium and methods of use thereof.

BACKGROUND

The use of soundwaves, including ultrasound waves with a frequency greater than 20 KHz, to locate underwater objects is well known. Typically, referred to as sonar, the technique involves the transmission of ultrasound waves and the detection of resulting echoes to locate underwater objects. Apart from military applications, sonar is commonly used by fishing boats to find schools of fish and by oceanographers in hydrographic surveys.

However, in addition to underwater location applications, ultrasound waves are used for a variety of other applications, including but not limited to:
- as a non-contact sensor;
- as a flowmeter;
- as a weapon;
- in non-destructive testing, including finding flaws in materials and measuring the thickness of objects;
- in medical imaging and medical therapy, including fragmentation treatment;
- in ultrasonic cleaning and disintegration;
- in ultrasonic welding;
- in clearing blocked conduits; and
- in slurry density measurements.

However, a problem in general with the use of soundwaves, including ultrasound waves, is that it can be difficult to identify and locate an echo or excitation signal from ambient noise in a medium subjected to the soundwaves.

Another problem in general with the use of soundwaves, including ultrasound waves, it that the waves typically lack the required range to propagate along a fluid medium a required distance.

It will be clearly understood that, if a prior art publication is referred to herein, this reference does not constitute an admission that the publication forms part of the common general knowledge in the art in Australia or in any other country.

SUMMARY OF INVENTION

Embodiments of the present invention provide a shock wave signal generator and methods of use thereof, which may at least partially address one or more of the problems or deficiencies mentioned above or which may provide the public with a useful or commercial choice.

According to a first aspect of the present invention, there is provided a shock wave signal generator for introducing a shock wave signal into a fluid medium, said generator including:
- an excitation source; and
- an excitable substance operatively associated with the excitation source and the fluid medium, said substance configured to be excited by the excitation source and introduce at least one said shock wave signal into the fluid medium.

According to a second aspect of the present invention, there is provided a shock wave signal generator for introducing a shock wave signal into a fluid medium, said generator including:
- a striker; and
- a resonator operatively associated with the fluid medium, said resonator configured to resonate when struck by the striker and emit a supersonic pulse that introduces at least one said shock wave signal into the fluid medium.

According to a third aspect of the present invention, there is provided a resonator for use with the shock wave signal generator of the first or second aspects, said resonator having an upper end adapted to be struck by a striker, an opposed lower end in contact with or near the fluid medium and an elongate body extending therebetween, said resonator configured to be slidably received in a bore of a housing and act as a piston when struck by the striker to displace at least a portion of the fluid medium and at least partially assist in guiding and/or shaping at least one shock wave signal in the fluid medium.

According to a fourth aspect of the present invention, there is provided a resonator unit for use with the shock wave signal generator of the first or second aspects, said resonator unit including:
- a resonator configured to resonate when struck by a striker and emit a supersonic pulse that introduces at least one shock wave signal into a fluid medium, said resonator having an upper end adapted to be struck by the striker, an opposed lower end in contact with or near the fluid medium and an elongate body extending therebetween; and a body connectable to a conduit conveying the fluid medium and configured to at least partially house the resonator, said body including a central bore for slidingly receiving the resonator therethrough.

Preferably, wherein the resonator acts as a piston when struck by the striker to displace at least a portion of the fluid medium and at least partially assist in guiding and/or shaping the at least one shock wave signal in the fluid medium.

According to a fifth aspect of the present invention, there is provided an anomaly detection system for detecting an anomaly in a fluid medium, said system including:
- at least one shock wave signal generator in accordance with the first or second aspects for introducing at least one shock wave signal into the fluid medium;
- at least one detector for detecting signals in the fluid medium; and
- at least one processor configured to identify excitation signals in the fluid medium caused by said at least one shock wave signal, wherein identification of said excitation signals is indicative of the anomaly.

Advantageously, embodiments of the present invention provide a shock wave signal generator that is able generate at least one shock wave signal in a fluid medium. The shock wave signal generator has applicability as a substitute for sound or ultrasound waves in the identification and location of anomalies in a conduit containing a fluid medium. By using at least one shock wave signal, the signal advantageously is able propagate further along a fluid medium than a sound or ultrasound wave signal thereby enabling greater versatility. Further, the at least one shock wave signal creates a characteristic excitation signal at any anomaly site identified that is readily detectable and a great improvement over the sound wave distortion caused by the use of a conventional sound or ultrasound wave signal. In turn, this greatly improves the accuracy of the system.

The present invention is at least in part predicated on the principle that the introduction of the at least one shock wave signal into a fluid medium causes detectable excitation signals at a site of an anomaly, such as, e.g., a solid object, a blockage, an abnormal formation or other like anomaly in the fluid medium or on an inner surface of a conduit conveying the fluid medium. The detectable excitation signals may be used to identify and locate the site of such anomalies.

More specifically, the introduction of the at least one shock wave signal may cause a momentary step change in pressure from accumulated and compressed sound waves. The introduction of the at least one shock wave signal into the fluid medium may causes cavitation or "bubble-pulses" on features of a fluid-solid boundary.

Cavitation or bubble-pulses is a phenomenon in which a rapid change in pressure in a fluid medium results in the formation of at least one vapour-filled cavity or bubble. The bubble-pulse may be caused by the initial shock wave signal causing a rapid change of pressure and imparting an energy of motion into the fluid medium resulting in the formation of the vapor-filled bubble.

Upon formation, the bubble may expand radially outward beyond a point at which its internal pressure equals a hydrostatic head of the surrounding fluid medium. Hydrostatic pressure of the surrounding fluid medium may then halt radial expansion of the bubble and, since an interior of the bubble is at a lower pressure, the bubble may begin to contact. At a point of collapse, at least one secondary shock wave signal may be emitted, and the cycle of expansion and contraction may be repeated until all the energy of motion is dissipated.

Each cycle of expansion and contraction may be referred to as a "pulse". Generally, each succeeding pulse may decrease in amplitude and duration.

The pulses may have a characteristic frequency profile that may be detected with at least one detector, such as, e.g. a hydrophone. The frequency profile may be characterised in having a series of peaks with decreasing amplitude and duration as a function of time. The series of peaks may correspond to the over pressure profile of the bubble pulse and typically may have substantially greater amplitude than other signals corresponding to background noise.

The shock wave signal generator of the present invention is intended for use in anomaly identification and location as a substitute for sound or ultrasound waves and hereinafter will be described with reference to this example application. However, a person skilled in the art will appreciate that the generator is capable of broader applications, such as, e.g., stealthy sonar, dam leaks, ship hull leaks, ultrasonic cleaning and disintegration, extracorporeal shock wave lithotripsy, and in clearing blocked conduits.

The generator and system of the present invention may be permanently installed along a length of a conduit for fixed condition monitoring of the length of conduit or may be provided as a portable test instrument. For example, the generator and system may be installed at one point to monitor a length of conduit.

The length of conduit monitored may be of any suitable length. For example, the length of conduit may have a length of about 50 m, about 100 m, about 150 m, about 200 m, about 250 m, about 300 m, about 350 m, about 400 m, about 450 m, about 500 m, about 550 m, about 600 m, about 650 m, about 700 m, about 750 m, about 800, about 850 m, about 900 m, about 950 m, about 1,000 m, about 1,050 m, about 1,100 m, about 1,150 m, about 1,200 m, about 1,250 m, about 1,300 m, about 1,350 m, about 1,400 m, about 1,450 m, about 1,500 m, about 1,550 m, about 1,600 m, about 1,650 m, about 1,700 m, about 1,750 m, about 1,800 m, about 1,850 m, about 1,900 m, about 1,950 m, about 2,000 m, about 2,050 m, about 2,100 m, about 2,150 m, about 2,200 m, about 2,250 m, about 2,300 m, about 2,350 m, about 2,400 m, about 2,450 m, about 2,500 m, about 2,550 m, about 2,600 m, about 2,650 m, about 2,700 m, about 2,750 m, about 2,800 m, about 2,850 m, about 2,900 m, about 2,950 m, about 3,000 m, about 3,050 m, about 3,100 m, about 3,150 m, about 3,200 m, about 3,250 m, about 3,300 m, about 3,350 m, about 3,400 m, about 3,450 m, about 3,500 m, about 3,550 m, about 3,600 m, about 3,650 m, about 3,700 m, about 3,750 m, about 3,800 m, about 3,850 m, about 3,900 m, about 3,950 m, about 4,000 m, about 4,050 m, about 4,100 m, about 4,150 m, about 4,200 m, about 4,250 m, about 4,300 m, about 4,350 m, about 4,400 m, about 4,450 m, about 4,500 m, about 4,550 m, about 4,600 m, about 4,650 m, about 4,700 m, about 4,750 m, about 4,800 m, about 4,850 m, about 4,900 m, about 4,950 m, about 5,000 m, about 5,050 m, about 5,100 m, about 5,150 m, about 5,200 m, about 5,250 m, about 5,300 m, about 5,350 m, about 5,400 m, about 5,450 m, about 5,500 m, about 5,550 m, about 5,600 m, about 5,650 m, about 5,700 m, about 5,750 m, about 5,800 m, about 5,850 m, about 5,900 m, about 5,950 m, about 6,000 m, about 6,050 m, about 6,100 m, about 6,150 m, about 6,200 m, about 6,250 m, about 6,300 m, about 6,350 m, about 6,400 m, about 6,450 m, about 6,500 m, about 6,550 m, about 6,600 m, about 6,650 m, about 6,700 m, about 6,750 m, about 6,800 m, about 6,850 m, about 6,900 m, about 6,950 m, about 7,000 m, about 7,050 m, about 7,100 m, about 7,150 m, about 7,200 m, about 7,250 m, about 7,300 m, about 7,350 m, about 7,400 m, about 7,450 m, about 7,500 m, about 7,550 m, about 7,600 m, about 7,650 m, about 7,700 m, about 7,750 m, about 7,800 m, about 7,850 m, about 7,900 m, about 7,950 m or about 8,000 m or more.

The conduit may include any tubular section used to convey a flowable fluid medium, preferably a liquid fluid medium, such as, e.g., water, refined petroleum, fuels, oil, biofuel, chemical solutions, oil and other fluids.

Generally, the conduit may be an underground or buried conduit. The conduit may typically include a pair of opposed ends and at least one sidewall extending longitudinally therebetween. Usually, the at least one sidewall is curved such that the conduit has a circular profile shape, although non-circular conduits are also encompassed. The conduit may typically be joined end-to-end with other like conduits to span distances. In some embodiments, the conduit may include a plurality of conduit sections or segments joined end-to-end.

The conduit may typically be formed from any suitable material or materials capable of conveying the fluid medium. Generally, the conduit may be formed from ceramic, concrete fibreglass, plastic and/or metal material or materials, typically steel, copper, aluminium, concrete or plastic material or materials, preferably steel or high-density polyethylene (HDPE).

The conduit may include one or more access points or connections for accessing internal contents of the conduit. The access points may include a fitting, such as, e.g., a saddle or tee fitting. The connections may include a branch conduit, for example. The one or more access points or connections preferably enable the internal contents of the conduit to be accessed without interrupting a flow of the fluid medium in the conduit or requiring emptying of the conduit.

The at least one shock wave signal generator may be of any suitable size, shape and construction for introducing at least one shock wave signal into the fluid medium, preferably by producing a supersonic pulse. The at least one shock wave signal generator may introduce the at least one shock wave signal via the one or more access points or connections in the conduit, such as, e.g., via a conduit stand pipe. The supersonic pulse may become a shock wave at a fluid medium interface and may further cause a bubble pulse. The resultant shock wave and bubble pulse noise may travel at sonic speeds in the fluid medium.

In some embodiments, the at least one shock wave signal generator may include an excitable substance capable of being excited by the excitation source and introduce the at least one shock wave signal into the fluid medium.

In some such embodiments, the excitation source may include a laser and the excitable substance may include one or more water molecules. In such embodiments, the laser may ionise the one or more water molecules causing the breakdown of the water molecules and the generation of the at least one shock wave signal.

In other similar such embodiments, the excitation source may again include a laser and the excitable substance may include material associated with the conduit conveying the fluid medium. In such embodiments, the laser may ablate material in the conduit causing an explosion and a resulting shock wave signal. The material ablated may preferably be metal material or materials.

In other such embodiments, the excitation source may include an electric arc and the excitable substance may include one or more water molecules. The electric arc may be provided from at least one electrode. In such embodiments, the electric arc may excite the one or more water molecules causing a breakdown of the water molecules and ignition of resultant oxygen/hydrogen components. A resultant explosion may generate the at least one shock wave signal. In such embodiments, the at least one electrode may be housed within a small blast chamber.

In other similar such embodiments, the excitation source may again include an electric arc and the excitable substance may include material associated with the conduit conveying the fluid medium. In such embodiments, the electric arc may superheat material in the conduit causing an explosion and a resulting shock wave signal. The material heated may preferably be metal material or materials.

In further such embodiments, the at least one shock wave signal generator may include an air gun. The air gun may include one or more pneumatic chambers pressurised with compressed air. When fired into the fluid medium, a solenoid may be triggered to release air into a fire chamber, which in turn may cause a piston to move thereby allowing the air to escape the main chamber and produce a supersonic pulse to generate the at least one shock wave signal.

In yet further embodiments, the at least one shock wave signal generator may include a vacuum chamber and a valve configured to rapidly open and allow an inflow of the fluid medium into the chamber. The rapid inflow of the fluid medium into the vacuum chamber may produce a supersonic pulse to generate the at least one shock wave signal.

In yet further embodiments, the at least one shock wave signal generator may include an electro strictive material adapted to produce a supersonic pulse and generate the at least one shock wave signal when excited by an electric field, preferably a capacitor discharge, more preferably when shock loaded electronically via a capacitor charge. In such embodiments, the electro strictive material may be operatively associated with the fluid medium and may be formed from metal material or materials, such as, e.g., aluminium, titanium, lead magnesium niobate, lead magnesium niobate-lead titanate and/or lead lanthanum zirconate titanate.

In yet other embodiments, the at least one shock wave signal generator may include a magneto strictive material adapted to produce a supersonic pulse and generate the at least one shock wave signal when excited by an electric field, preferably a capacitor discharge, more preferably when shock loaded electronically via a capacitor charge. Again, in such embodiments, the magneto strictive material may be operatively associated with the fluid medium and may be formed from metal material or materials, such as, e.g., cobalt, Terfenol-D, Galfenol, Alfenol, Metglas 2605SC, Cobalt ferrite, Nickel, aluminium, an iron-aluminium alloy or any other suitable magneto strictive material.

In the above embodiments, the electro strictive material or magneto strictive material may have an elongate shape. Typically, the material may include a pair of opposed ends and an elongate body extending therebetween, preferably linearly. A lower end of the pair of opposed ends may be operatively associated with the fluid medium, preferably in contact with or near the fluid medium so as to introduce the at least one shock wave signal into the fluid medium.

In preferred embodiments, the at least one shock wave signal generator may include a resonator capable of producing a supersonic pulse that causes at least one shock wave signal in the fluid medium.

The resonator may be of any suitable size, shape and construction and formed from any suitable material capable of resonating and emitting a supersonic pulse when at least partially compressed, preferably struck. For example, the resonator may be formed from plastic and/or metal material or materials with a high speed of sound conductivity, such as, e.g., high-density polyethylene (HDPE), preferably aluminium or titanium, more preferably beryllium (12,890 m/s; Mach 8.59).

As mentioned, the resonator may include a pair of opposed ends and an elongate body extending therebetween, preferably linearly. The resonator may be of tubular or solid construction, preferably the latter. The pair of opposed ends may be open, closed or a combination thereof.

In such embodiments and in accordance with the fourth aspect, the shock wave signal generator may further include a body for at least partially housing the resonator and an excitation source for exciting the resonator. The excitation source may include any source suitably capable of causing the resonator to at least partially resonate.

The body may include an outer wall, an opposed inner wall and at least one side wall extending therebetween.

The inner wall may be configured to be connectable to the conduit, conduit branch or an access point such that resonator is at least in fluid communication with the fluid medium in the conduit. The inner wall may be connectable directly or indirectly with the conduit, conduit branch or access point.

The at least one side wall may be curved or rounded. The at least one side wall may also be connectable to the conduit, conduit branch or an access point. In some embodiments, the at least one side wall may further include a connecting mechanism or part of a connecting mechanism for connecting to the conduit, conduit branch or an access point, such as, e.g., a threaded outer surface configured to threadingly engage with a threaded surface of the conduit, conduit branch or access point.

The body may preferably be of solid construction. The body may include a bore extending through the body, preferably entirely between and through the outer and inner walls. The bore may be sized and shaped to at least partially receive the resonator.

The body may be formed from any suitable material or materials. For example, the body may be formed from metal or plastic material or materials, such as, e.g., steel, copper, aluminium, concrete or plastic material or materials, preferably steel or high-density polyethylene (HDPE), preferably HDPE.

The resonator may be received in the bore such that an outer end of the resonator at least partially protrudes outwardly from the outer wall of the body. In some embodiments, an inner end of the resonator may at least partially protrude outwardly from the inner wall of the body. In other embodiments, the inner end of the resonator may be at least partially recessed within the inner wall of the body. Preferably, the inner end of the resonator may be in contact with or near the fluid medium.

The body and the resonator may be of integral construction or may be separately formed.

In some embodiments, the resonator may be slidably received in the bore. For example, the resonator may be slidable between a retracted position in which the upper end of the resonator at least partially protrudes outwards from the upper wall of the body and a lowered position.

In preferred embodiments, the excitation source may include the striker for striking the outer end of the resonator and thereby exciting the resonator to generate a supersonic pulse.

Any suitable striker may be used for striking the resonator and causing the resonator to produce the supersonic pulse. The striker may be of any suitable size, shape and construction and may be formed from any suitable material or materials, preferably a material harder than the resonator.

In some embodiments, the striker may be in the form of a weight configured to fall under the force of gravity or under the force of a biasing member or mechanism, such as, e.g., one or more springs, and strike the resonator.

Typically, the striker may form part of a striking mechanism including an actuating mechanism for moving the striker between a striking position in which it strikes the resonator and a retracted position. Any suitable type of actuating mechanism may be used.

The actuating mechanism may be manually actuated or by using a drive, preferably the latter. Movement may be linear or rotary.

In some embodiments, the actuating mechanism may include one or more biasing mechanisms. In some such embodiments, movement of the striker to the striking position may work against the force of the biasing mechanism, so that striker moves to the retracted position under the force of the biasing mechanism. In other such embodiments, movement of the striker to the striking position may work under the force of the biasing mechanism and movement of the striker to the retracted position may work against the force of the biasing mechanism.

The biasing mechanism may include one or more springs, such as, e.g., coil or leaf springs. Of course, a person skilled in the art will appreciate that other types of biasing mechanisms, such as, e.g., magnets or magnetized elements and the like may be used.

In some such embodiments, the actuating mechanism for driving the striker into the striking position may be an electromechanical solenoid.

In other such embodiments, the actuating mechanism for driving the striker into the striking position may be a magneto strictive arrangement.

In yet other such embodiments, the actuating mechanism for driving the striker into the striking position may be an electro strictive arrangement.

In yet other such embodiments, the actuating mechanism for driving the striker may be pneumatic arrangement. Advantageously, a pneumatic arrangement may remove spring harmonics.

The striker of the striking mechanism may include a hammer, plunger or piston for striking the outer end of the resonator. The striker may be formed of plastic or metal material or materials, preferably a material harder than the resonator, more preferably steel.

In some embodiments, the inner end of the resonator may include an inwardly curved or concave surface.

In other embodiments, the inner end of the resonator may include at least one concave recess defined thereon. The at least one concave recess may include curved or angled sidewalls, preferably the latter. The concave surface may produce a shockwave signal with a suppressed bubble pulse via a pumping mechanism that forces the voids to remain collapsed.

In some embodiment, when struck by the striking mechanism, the resonator may act as a piston in the bore and the inner end of the resonator may displace at least a portion of the fluid medium. In such embodiments, the inwardly curved or concave surface or concave recess defined on the inner end of the resonator may at least partially assist in guiding and/or shaping the at least one shock wave signal propagated in the fluid medium away from the shock wave signal generator.

Advantageously, the inwardly curved or concave surface or concave recess defined on the inner end of the resonator may also at least partially shape a resulting void that is formed. For example, a flat resonator inner end may result in a substantially disc-shaped void whereas the inwardly curved or concave surface or concave recess defined on the inner end of the resonator may increase the thickness of the void.

The at least one shock wave signal introduced into the fluid medium by the shock wave signal generator may be in the form of a shock wave which may travel through the fluid medium along the conduit.

Alternatively, the at least one shock wave signal introduced into the fluid medium may create at least one bubble-pulse at the inner end of the resonator, which may generate secondary shock waves that travel along the conduit in the fluid medium as the bubble-pulse pulses. The secondary shock waves may create further bubble-pulses along the conduit, such as, e.g., at an anomaly site.

As indicated, the system includes at least one detector for detecting signals in the fluid medium, preferably excitation signals caused by propagation of at least one shock wave signal in the fluid medium. The excitation signals may preferably include signals corresponding to a bubble-pulse.

The at least one detector may be of any suitable size, shape and construction, and may be located in any suitable location relative to the at least one shock wave signal generator.

Generally, the at least one detector may include any suitable detector capable of identifying a frequency profile characteristic or indicative of a bubble-pulse.

In preferred embodiments, the at least one detector may include at least one hydrophone. In some such embodiments, the at least one hydrophone may be a directional hydrophone.

The at least one detector may be located together with, or away from, the at least one shock wave signal generator, preferably the latter.

In some embodiments, the at least one shock wave signal generator and the at least one detector may or may not form a single unit and may be located on one side of an anomaly site in a conduit.

For example, in some such embodiments, the at least one shock wave signal generator and the at least one detector may be a single unit connectable to the conduit, conduit branch or an access point, typically via a conduit stand pipe. The single unit may be located on one side of an anomaly site in a conduit.

In such embodiments, the at least one detector may be located near the inner end of the resonator in the body or coupled to the inner wall of the body and in fluid communication with one another, preferably via the bore, or a passageway extending from the bore, interconnecting the inner end of the resonator with the at least one detector.

In such embodiments, the at least one shock wave signal generator and the at least one detector may be at least partially separated from one another by an attenuation device for at least partially attenuating a shock wave signal reaching the at least one detector, preferably directly reaching the at least one detector from the at least one shock wave signal generator.

The attenuation device may be of any suitable size, shape and form.

Generally, the attenuation device may be in the form of a shield located between the resonator of the at least one shock wave signal generator and the and the at least one detector. The shield may be sized and shaped to block at least about 25%, at least about 30%, at least about 35%, at least about 40%, at least about 45%, at least about 50%, at least about 55%, at least about 60%, at least about 65%, at least about 70%, or at least about 75% of a cross sectional area of the passageway interconnecting the inner end of the resonator with the at least one detector, typically at least about 50%.

In some embodiments, the attenuation device may include a shield sized and shaped to guide the at least one shockwave signal around the at least one detector without adding wave drag. Preferably, the shield may be sized and shaped according to the principles of the area rule.

Advantageously, the inclusion of the attenuation device between the at least one shock wave signal generator and the at least one detector may not only prolong the operable life of the detector but also at least partially prevent the at least one detector being overloaded with signal.

In other embodiments, the at least one shock wave signal generator and the at least one detector may be separately located relative to the conduit and the anomaly site in the conduit.

For example, in one such embodiment, the at least one shock wave signal generator and the at least one detector may be located on opposite sides of the anomaly site.

In another such embodiment, the at least one shock wave signal generator and the at least one detector may be located on a same side of an anomaly site but separate from one another.

A person skilled in the art will appreciate that an operator will normally not know a location of an anomaly site and therefore may arrange the at least one shock wave signal generator and the at least one detector apart from one another in a spaced arrangement to define a test length of conduit. The operator may then move the test length along a length of the conduit while maintaining the spaced arrangement until the anomaly site is detected and located.

In embodiments in which the at least one shock wave signal generator and the at least one detector are separated from one another, the at least one detector may be located in the conduit via the one or more access points or connections as previously described. The at least one detector may be located in line with the fluid medium in the conduit.

In some embodiments, the system may include more than one detector. For example, the system may include two, three, four or five or more detectors. The detectors may be located in any suitable arrangement relative to the at least one shock wave signal generator and the conduit. For example, the detectors may be arranged on either side of the at least one shock wave signal generator along a length of conduit.

As indicated, the system includes at least one processor configured to identify excitation signals in the fluid medium caused by said at least one shock wave signal to thereby identify an anomaly site. Further, the at least one processor may be configured to measure a time between introduction of the at least one shock wave signal and detection of the excitation signals to determine a location of the anomaly site.

The at least one processor may typically form part of a processing device including one or more processors and memory. The one or more processors may include multiple inputs and outputs coupled to electronic components of the system.

For example, the processors may have at least one input coupled to the at least one input coupled to the at least one detector. Likewise, the processors may have an output coupled to the at least one shock wave signal generator, typically at least one output and at least one input.

The processing device may include a microcomputer, an external processing device, such as, e.g., a computer, a tablet, a smart phone, a PDA or at least one remotely accessible server. In other embodiments, the processing device may include a dedicated microprocessor operatively associated with one or both of the at least one shock wave signal generator and the at least one detector.

The processing device may be operatively associated with the at least one shock wave signal generator and the at least one detector for at least collecting data corresponding to the timing of the initiation of the at least one shock wave signal and resulting signals detected in the fluid medium, including the amplitude, duration and timing of said resulting signals.

The system may further include a communications module for connecting the system to an external device, such as, e.g., an external processing device, a controller, an external display or a storage device. The system may be connected to the external device in any suitable way.

For example, in some such embodiments, the communications module may be in the form of a port or access point (e.g., a USB or mini-USB port) such that the system may be connected to the external device using a suitable cable.

In other such embodiments, the communications module may be in the form of a wireless communications module, such as, e.g., a wireless network interface controller, such that the system may wirelessly connect to the external device via a wireless network, e.g., a Wi-Fi (WLAN) communication, Satellite communication, RF communication, infrared communication, or Bluetooth™). In such embodiments, the communications module may include at least one modem, such as, e.g., a cellular or radio modem.

In some embodiments, the system may include a power supply for powering electrical components of the system, including the at least one shock wave signal generator and the at least one detector. The power source may include an on-board power source, such as, e.g., one or more batteries. In other embodiments, the power source may include an external power source, such as, e.g., a mains supply or generator.

In some embodiments, the system may further include a controller for controlling operation of the at least one shock wave signal generator and the at least one detector. The controller may be operatively connected to the at least one shock wave signal generator and the at least one detector. The controller may be wired or wirelessly connected to the system.

The controller may preferably be a remote controller. The remote controller may be of any suitable size, shape and form.

The remote controller may include one or more keys, buttons and/or switches for an operator to control operation of the system.

Generally, the excitation signals may be caused by the shock wave signal introduced by the at least one shock wave signal generator and/or secondary shock waves generated by bubble-pulses travelling through the fluid medium and causing any anomaly to resonate or create a bubble pulse at the site of the anomaly. Typically, any anomaly may resonate or echo with a same or similar frequency profile as a bubble-pulse.

According to a sixth aspect of the present invention, there is provided a method of detecting an anomaly in a fluid medium, said method including:
introducing at least one shock wave signal into the fluid medium with the shock wave signal generator of the first or second aspects;
sensing one or more parameters of the fluid medium subject to the shock wave signal; and
identifying one or more excitation signals caused by the shock wave signal in the one or more parameters sensed to identify the anomaly.

The method may include one or more characteristics or features of the shock wave signal generator and/or the system as hereinbefore described.

The introducing may generally include using the shock wave signal generator to create a supersonic pulse and introduce the at least one shock wave signal into the fluid medium, preferably via the one or more access points or connections for accessing internal contents of the conduit.

The sensing may preferably be undertaken by the at least one detector, preferably at least one hydrophone. The one or more parameters measured may be signals corresponding to sound waves and pressure waves in the fluid medium.

The identifying may generally be undertaken by a processing device, including one or more processors and a memory, such as, e.g., a computing device.

The processing device may identify the one or more excitation signals by analysing the signal data collected by the at least one detector and identifying any signals having a characteristic frequency profile of a bubble-pulse, preferably characterised by a series of peaks of amplitude and duration as a function of time, typically corresponding to the pulses or oscillations of the bubble pulse.

According to a seventh aspect of the present invention, there is provided a method of guiding and/or shaping at least one shock wave signal in a fluid medium, said method including:
providing a shock wave signal generator having a resonator in accordance with the third aspect;
striking the upper end of the resonator with a striker to excite the resonator and cause the resonator to act as a piston in a bore of the housing within which it is slidably received; and
responsive to being struck, displacing at least a portion of the fluid medium with the lower end of the resonator as it extends outwardly from the housing to at least partially assist in guiding and/or shaping the at least one shock wave signal generated and introduced into the fluid medium.

The method may include one or more characteristics or features of the shock wave signal generator, resonator and system as hereinbefore described.

In some embodiments, the lower end of the resonator may include an inwardly curved or concave surface defined thereon that may at least partially shape spherical voids formed as a result of the piston movement of the resonator. Advantageously, the inwardly curved or concave surface may produce a shockwave signal with supressed bubble pulse as the piston movement forces the voids formed to remain collapsed.

Advantageously, the method may assist in guiding a shockwave signal propagated in the fluid medium to travel into the conduit.

Any of the features described herein can be combined in any combination with any one or more of the other features described herein within the scope of the invention.

The reference to any prior art in this specification is not and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of Invention in any way. The Detailed Description will make reference to a number of drawings as follows:

FIGS. 11A, 11B and 11C, respectively, show a plot of signal data collected from a test site using the anomaly detection system as shown in FIG. 8 and magnified portions of the plot showing points of interest;

DETAILED DESCRIPTION

FIGS. 1A, 1B and 2 to 7 show embodiments of a shock wave signal generator (100) and parts thereof for generating and introducing at least one shock wave signal into a conduit conveying a liquid fluid medium.

Figure 1B:
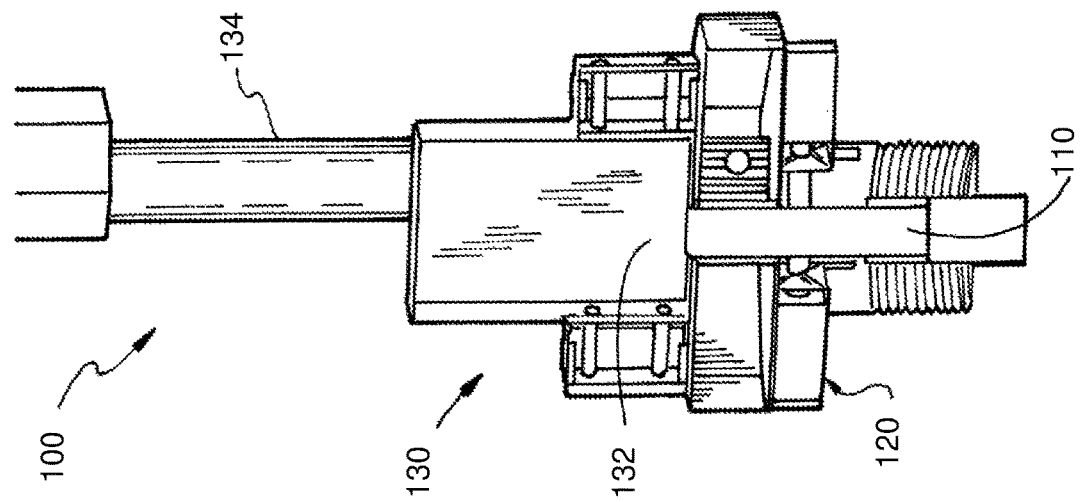
FIGS. 1A and 1B are illustrations respectively showing a shock wave signal generator according to an embodiment of the present invention in an inactive and active position.
Figure 1A:
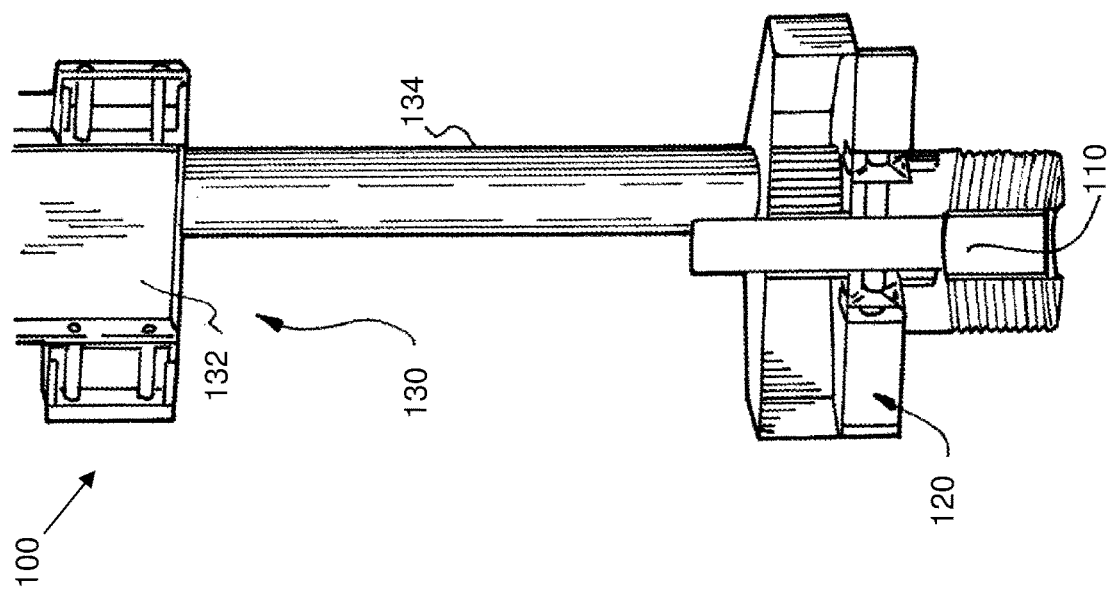

Referring to FIGS. 1A and 1B, the shock wave signal generator (100) includes a resonator (110), a body (120) for at least partially housing the resonator (110) and a striking mechanism (130) for striking the resonator (110) and causing the resonator (110) to produce a supersonic pulse for producing the shock wave signal in the fluid medium (not shown).

Figure 3:
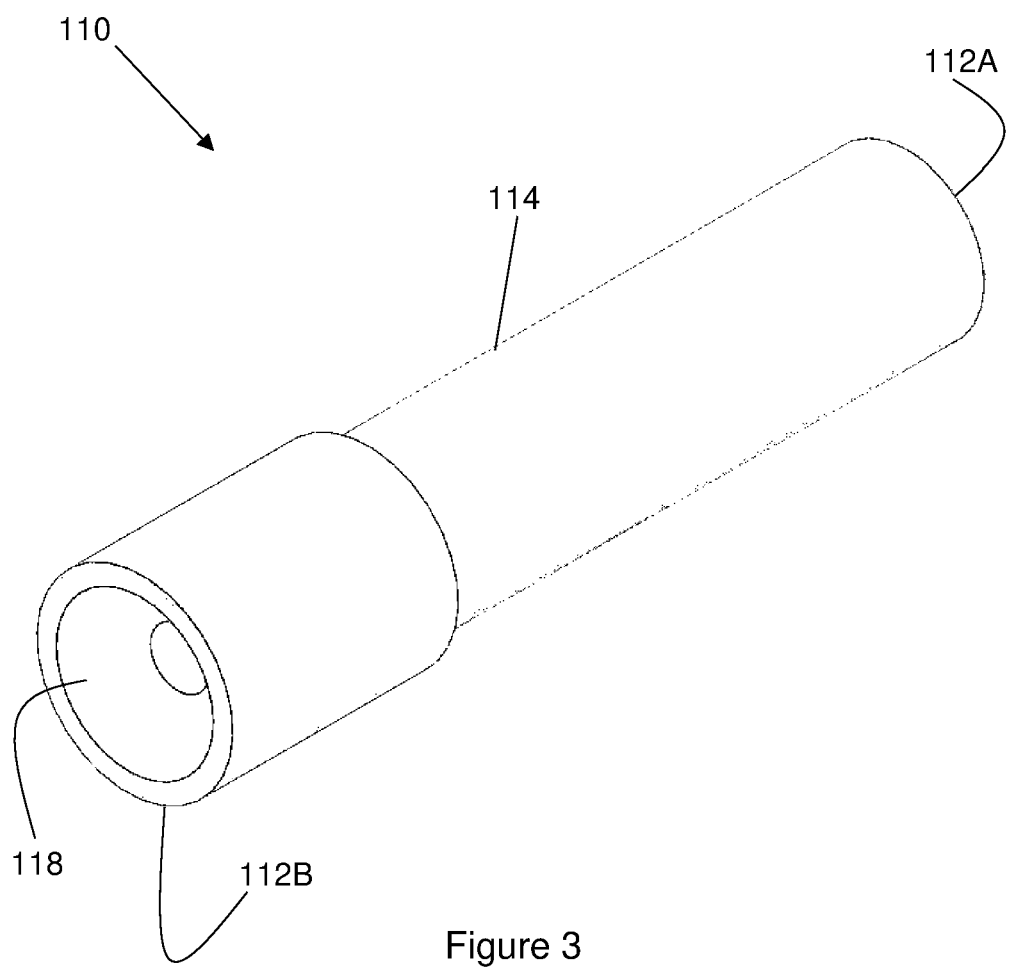
FIG. 3 is a perspective view of the resonator as shown in FIG. 2.

Referring briefly to FIG. 3, the resonator (110) is formed from an aluminium rod and includes a pair of opposed ends (112) and an elongate body (114) extending therebetween. The resonator (110) is of a solid construction and has a closed outer end (112A) and a closed inner end (112B).

Figure 2:
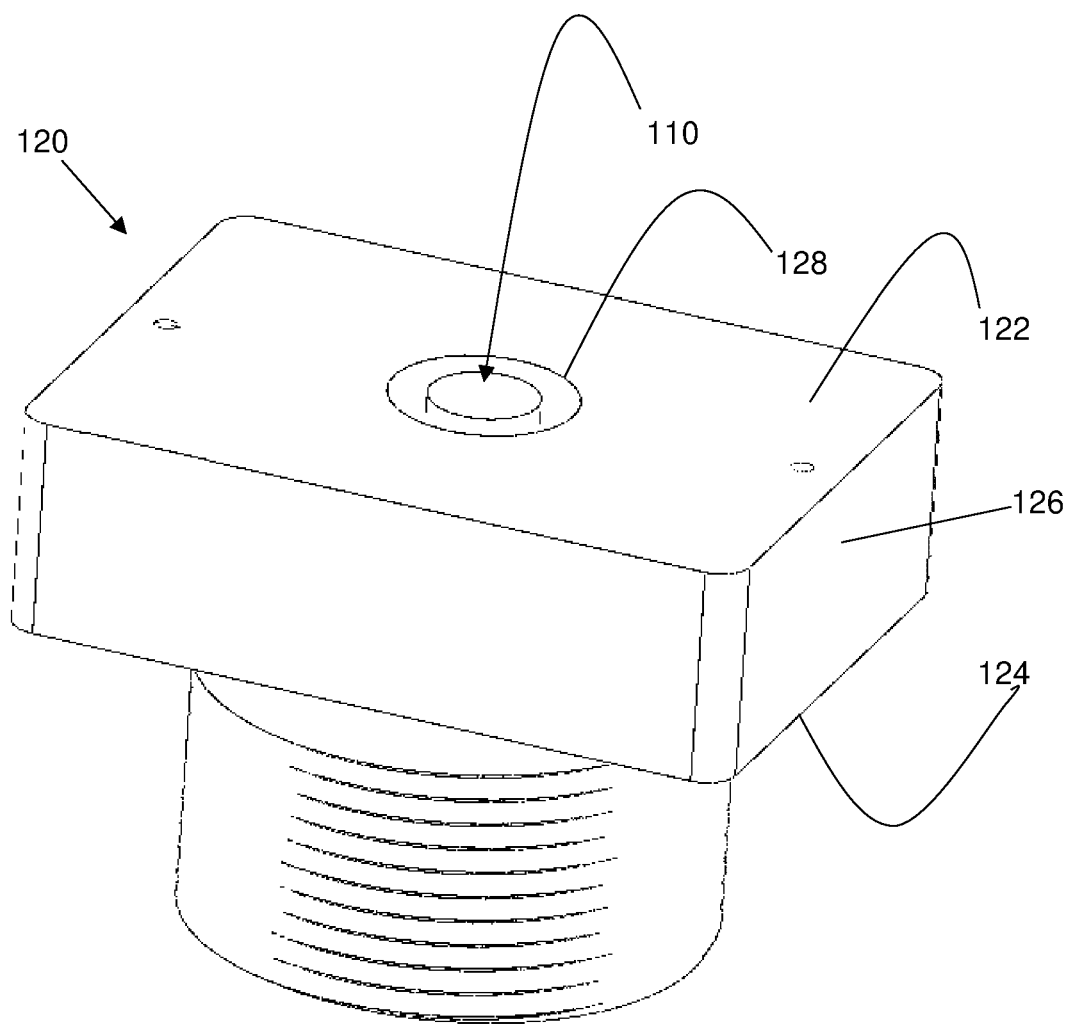
FIG. 2 is an upper perspective view of a body and resonator of the shock wave signal generator shown in FIGS. 1A and 1B.

Referring to FIG. 2, the body (120) for at least partially housing the resonator (110) includes an outer wall (122), an opposed inner wall (124) and at least one sidewall (126) extending therebetween.

The body (120) is of solid construction and includes a central bore (128) extending entirely between and through the outer and inner walls (122, 124) for slidably receiving the resonator (110).

The inner wall (124) and a portion of the at least one sidewall (126) are connectable to an access point in a conduit such that a lower end of the resonator (110) is in contact with the fluid medium in the conduit when the resonator (110) is in the bore (128).

The outer end of the resonator (110) at least partially protrudes above the outer wall (122) of the body (120) for striking by the striking mechanism (130; not shown).

The inner end of the resonator (110) is at least partially recessed within the lower wall (124) of the body (120).

Referring back to FIGS. 1A and 1B, the striking mechanism (130) includes a striker (132) moveable between a retracted position, shown in FIG. 1A, and a striking position, shown in FIG. 1B, a linear actuator (134) for driving movement of the striker (132) from the striking position to the retracted position, and a release mechanism (not shown) for releasing the striker (132) when in the retracted position to fall and strike the upper end of the resonator (110).

In use, movement of the striker (132) to the striking position occurs under the force of gravity and movement of the striker (132) to the retracted position occurs against the force of gravity via the linear actuator (134).

Referring again to FIG. 3, the inner end (112B) of the resonator (110) includes a concave surface (118). When struck by the striking mechanism (130; not shown), the resonator (110) acts partly like a piston in the body (120; not shown) and the concave surface (118) of the lower end (112B) displaces at least a portion of the fluid medium to at least partially assist in guiding and/or shaping a shock wave signal away from the shock wave signal generator (100) and along a conduit.

Figure 5:
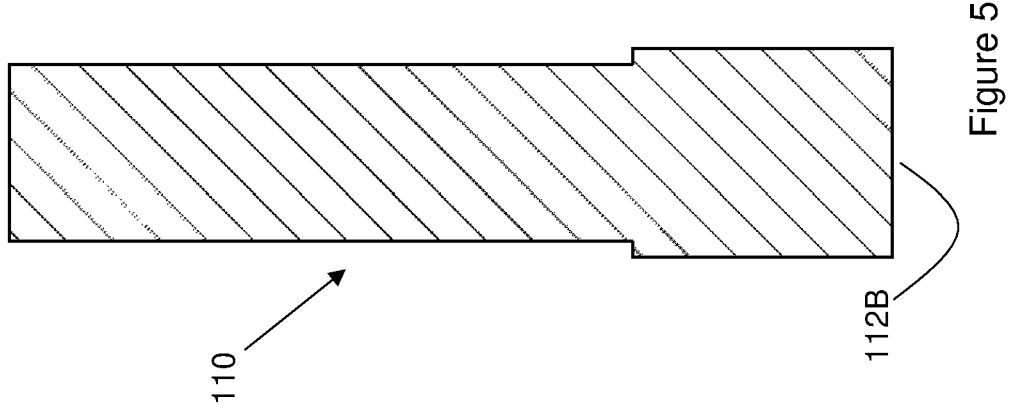
FIG. 5 is a sectional side view of a resonator according to another embodiment of the present invention.
Figure 4:
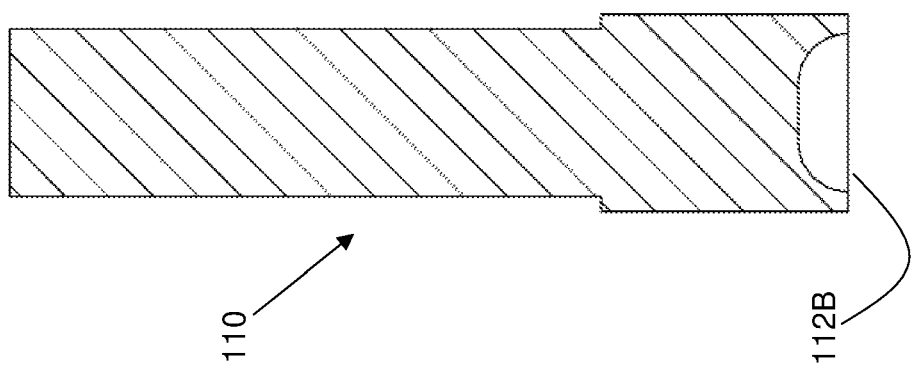
FIG. 4 is a sectional side view of the resonator shown in FIG. 3.

FIGS. 4 and 5 show differing embodiments of the resonator (110) alongside one another. For convenience, features that are similar or correspond to features of the previous embodiment will be referenced with the same reference numeral.

FIG. 4 shows a sectional side view of the resonator (110) as shown in FIG. 3.

FIG. 5 shows an embodiment of the resonator (110) having a flat lower end (112B).

In use, the resonator (110) as shown in FIGS. 3 and 4 will produce a partially spherical void formed as a result of the piston movement of the resonator (110) relative to the body (120; not shown).

Conversely, the resonator (110) as shown in FIG. 5 will produce substantially flat disc-shaped voids as a result of the piston movement of the resonator (110) relative to the body (120; not shown).

Figure 6:
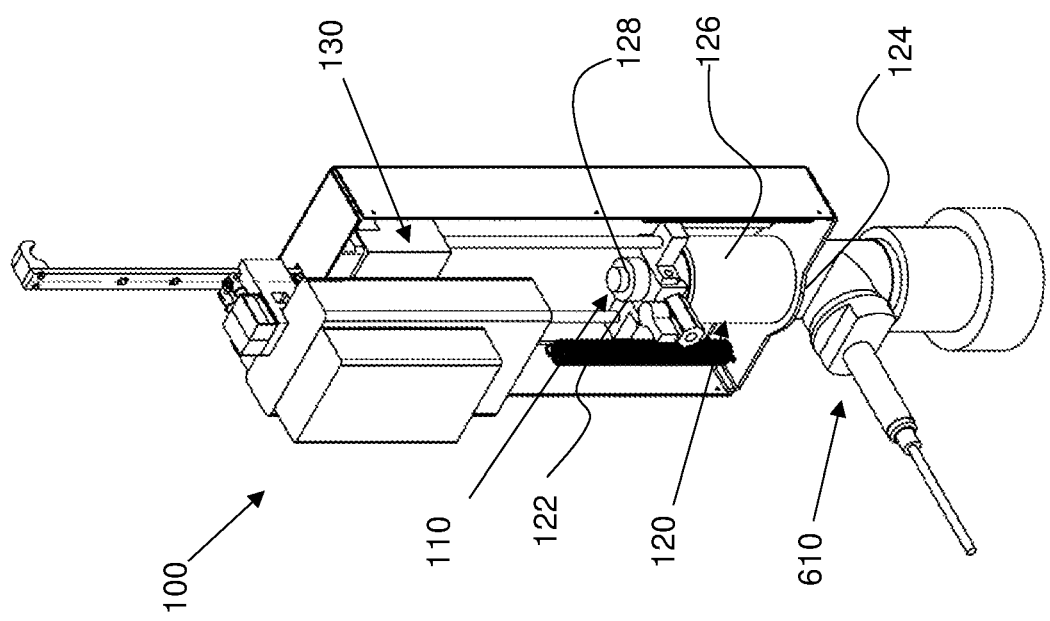
FIG. 6 is a perspective view of a single unit shock wave signal generator and detector with the housing partly removed.

FIG. 6 shows another embodiment of the shock wave signal generator (100) including a resonator (110), a body (120) for at least partially housing the resonator (110), a striking mechanism (130) for striking the resonator (110) and causing the resonator (110) to produce a supersonic pulse for producing the shock wave signal in the fluid medium (not shown) and a detector (610) in the form of a hydrophone for detecting signals in the fluid medium (not shown). For convenience, features that are similar or correspond to features of the previous embodiment will be referenced with the same reference numeral.

The body (120) includes an outer wall (122), an opposed inner wall (124) and at least one sidewall (126) extending therebetween.

The inner wall (124) and a portion of the at least one sidewall (126) are connectable to an access point in a conduit, such as, e.g., a hydrant standpipe, such that a lower end of the resonator (110) is in contact with the fluid medium in the conduit when the resonator (110) is in the bore (128).

The outer end of the resonator (110) at least partially protrudes above the outer wall (122) of the body (120) for striking by the striking mechanism (130).

The detector (610) is located near the inner end of the resonator (110) between the resonator (110) and the fluid conduit.

Figure 7:
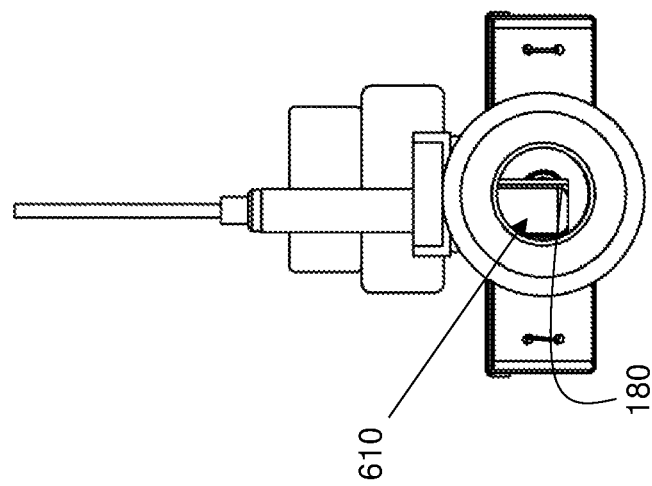
FIG. 7 is a sectional view of part of the single unit shock wave signal generator and detector shown in FIG. 6.

Referring to FIG. 7, the resonator (110; not shown) and the detector (610) are at least partially separated from one another by an attenuation device in the form of a shield (180) sized and shaped to at least partially attenuate a shock wave signal directly reaching the detector (610) from the inner end of the resonator (110; not shown).

The shield (180) is sized and shaped according to the principles of area to guide the shockwave signal around the detector (610) without adding wave drag.

Figure 8:
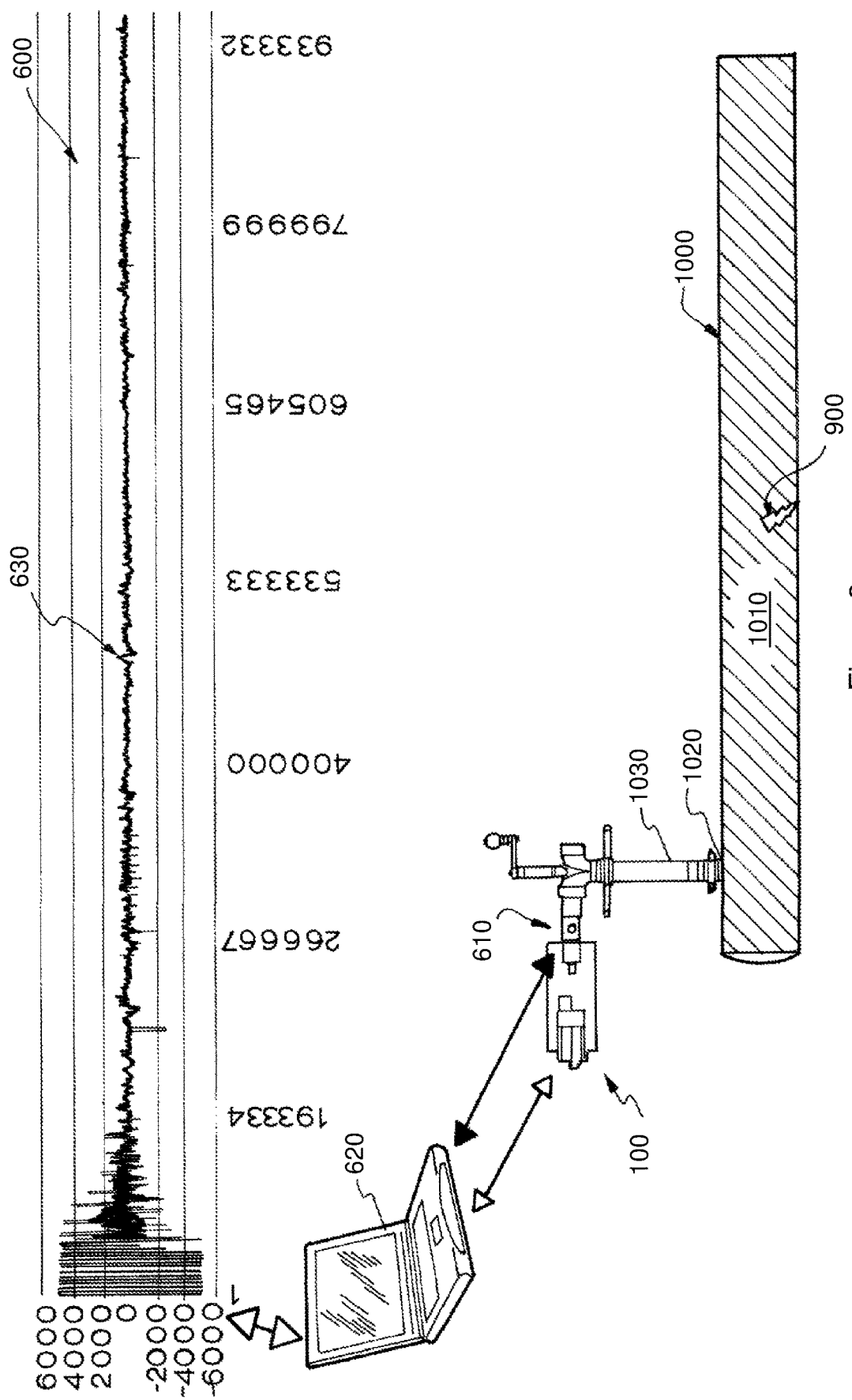
FIG. 8 is an illustration of an anomaly detection system according to an embodiment of the present invention.

FIG. 8 shows an anomaly detection system (600) for identifying and locating an anomaly (900) in a conduit (1000) conveying a liquid fluid medium (1010).

The anomaly detecting system (600) includes a shock wave signal generator (100) and detector (610), as previously described in relation to FIG. 5, for introducing at least one shock wave signal into the fluid medium (1010) and detecting signals in the fluid medium (1010), and a processing device (620) including one or more processors and a memory for: (i) identifying excitation signals (630) in the fluid medium (1010) caused by the at least one shock wave signal to identify a site of the anomaly (900) in the conduit (1000); and (ii) measuring a time between the introduction of the at least one shock wave signal and detection of the excitation signals (630) to determine a location of the site of the anomaly (900) in the conduit (1000).

Generally, the system (600) works on the principle that the introduction of the at least one shock wave signal into the fluid medium (1010) causes a detectable excitation signal (630) in the form of a bubble-pulse echo at the site of the anomaly (900).

The bubble-pulse is a phenomenon in which a rapid change in pressure in the fluid medium (1010) results in the formation of at least one vapour-filled cavity or bubble. The bubble-pulse is caused by the initial shock wave causing a rapid change of pressure and imparting an energy of motion into the fluid medium (1010) resulting in the formation of the vapor-filled bubble.

Upon formation, the bubble expands radially outward beyond a point at which its internal pressure equals a hydrostatic head of the surrounding fluid medium (1010). Hydrostatic pressure of the surrounding fluid medium (1010) then halts radial expansion of the bubble and, since an interior of the bubble is at a lower pressure, the bubble contacts. At a point of collapse, at least one secondary shock wave signal is emitted, and the cycle of expansion and contraction is repeated until all the energy of motion is dissipated.

Each cycle of expansion and contraction may be referred to as a "pulse". Generally, each succeeding pulse may decrease in amplitude and duration.

The pulses or excitation signals (630) have a characteristic frequency profile that can be detected with the detector (610). The frequency profile is characterised by a series of peaks with decreasing amplitude and duration as a function of time. The series of peaks correspond to the over pressure profile of the bubble pulse and have substantially greater amplitude than other signals corresponding to background noise in the fluid medium (1010).

As shown, the conduit (1000) is a tubular section for conveying the flowable fluid medium (1010), which in this embodiment is water.

The conduit (1000) is an underground conduit and includes a pair of opposed ends and at least one sidewall extending longitudinally therebetween. The conduit (1000) is joined end-to-end with other like conduits to span distances.

The conduit (1000) is formed from high-density polyethylene (HDPE).

As shown, the conduit (1000) includes an access point (1020) for accessing internal contents of the conduit (1000).

The shock wave generator (110) introduces the at least one shock wave signal via a standpipe (1030) connected to the access point (1020) into the conduit (1000).

As indicated, the detector (610) is a hydrophone capable of detecting a frequency profile characteristic of a bubble-pulse.

As shown, the processing device (620) is in the form of a laptop computer operatively connected to both the shock wave generator (100) and the detector (610).

The processing device (620) includes software configured to be run on the processing device (620) for controlling operation of the system (600). The software is interactive and allows an operator to interact and control operation of the system (600).

Figure 9:
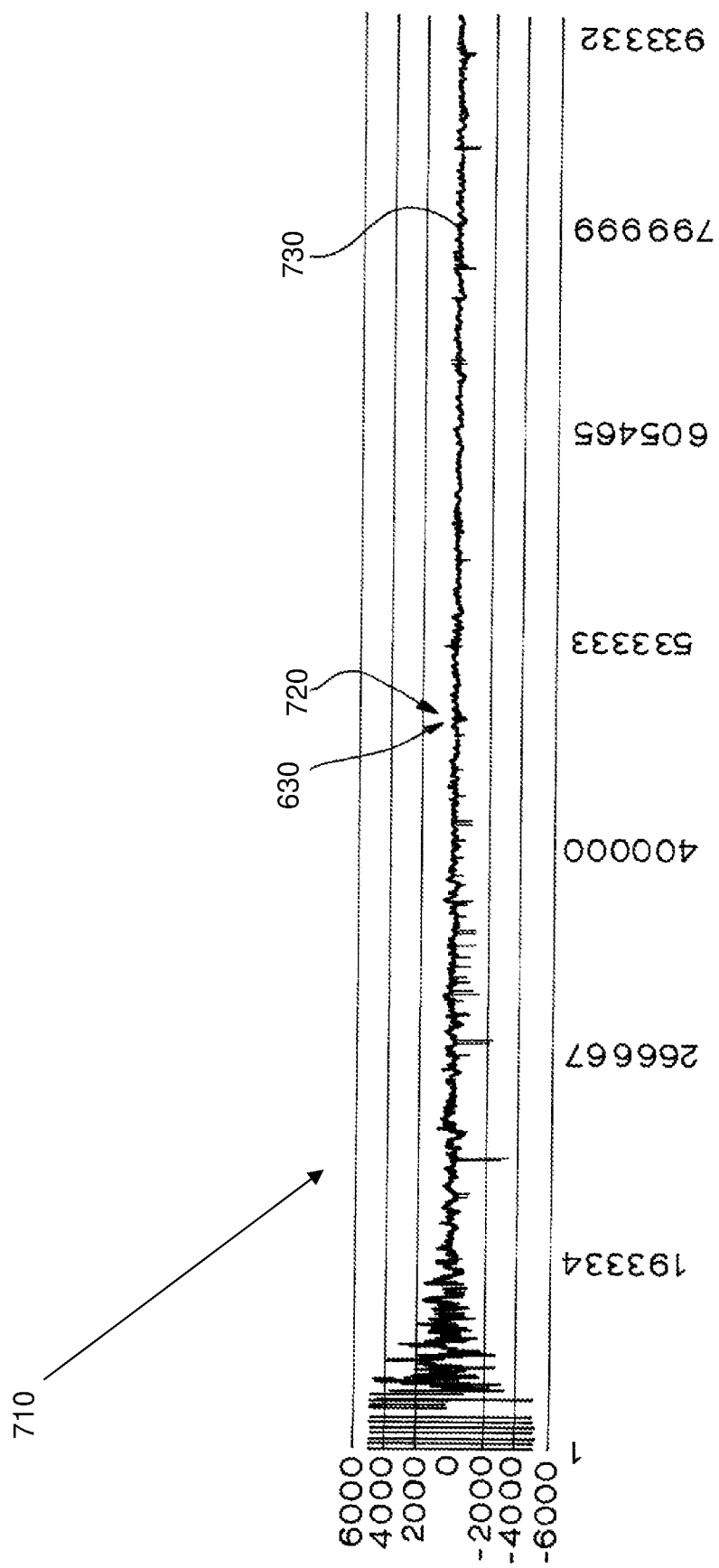
FIG. 9 is a plot showing a characteristic frequency profile of an anomaly site identified in a conduit and excited by the anomaly detection system as shown in FIG. 8.

Referring to FIG. 9, in identifying the excitation signals (630) caused by the shock wave signal, the processing device (620; not shown) analyses the signal data collected by the detector (610; not shown) for a frequency profile (710) characteristic of a bubble-pulse frequency profile (720). Signal data identified as having a frequency profile (710) characteristic of a bubble-pulse is identified as an excitation signal (630) and the site of an anomaly (900; not shown).

Generally, the excitation signals (630) are caused by the shock wave signal introduced by the shock wave generator (100; not shown) and secondary shock waves generated by oscillating bubble-pulses travelling through the fluid medium (1010; not shown) and causing any anomaly (900; not shown) to resonate or create a bubble pulse at the site of the anomaly (900; not shown). The anomaly (900; not shown) resonates with a same or similar frequency profile as a bubble-pulse.

Advantageously, the excitation of the anomaly (900; not shown) causes the site of the anomaly (900; not shown) to resonate louder than background noise (730) thereby assisting in the identification of its corresponding excitation signal (630) and characteristic frequency profile (720) from the background noise (730).

Referring back to FIG. 8, the processing device (620) determines a location of the anomaly (900) by measuring a time between the introduction of the shock wave signal and detection of the excitation signal (630).

Figure 10:
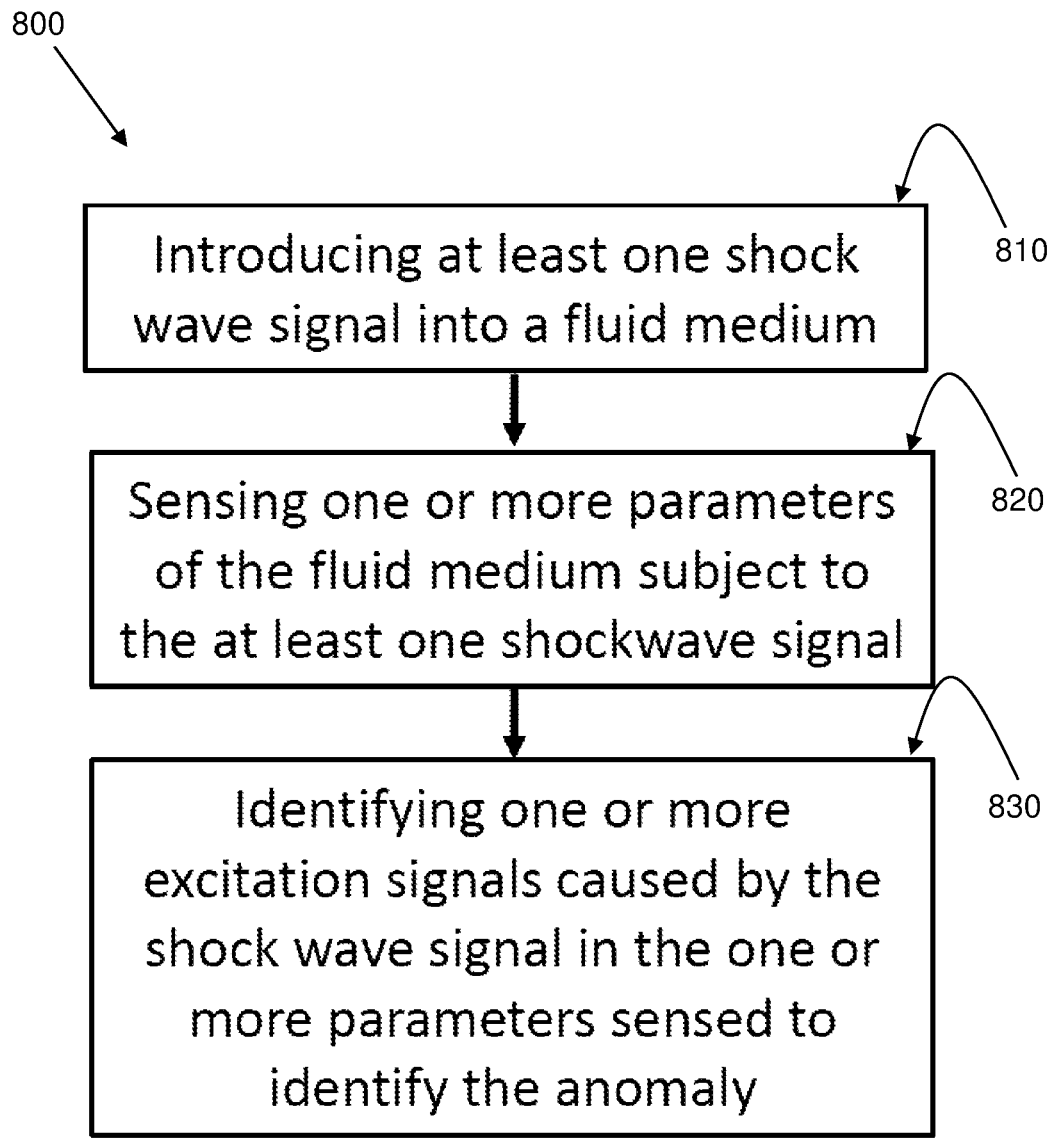
FIG. 10 is a flowchart showing steps in a method of identifying an anomaly according to an embodiment of the present invention.

A method (800) of using the system (600) as shown in FIG. 8 to identify and locate an anomaly (900) in a conduit (1000) is now described in detail with reference to FIG. 10.

At step 810, a shock wave signal is introduced into the fluid medium (1010) using the shock wave signal generator (100) via access point (1020) in the conduit (1000) containing the fluid medium (1010).

At step 820, the detector (610), in the form of the hydrophone located in the fluid medium (1010) also via access point (1020) of the conduit (1000), is used to sense or detect signals in the fluid medium (1010).

At step 830, data indicative of the timing of the introduction of the shock wave signal and any signals detected by the detector (610) are transmitted to the processing device (620).

The processing device (620) identifies excitations signals (630) indicative of an anomaly (900) by analysing the signal data collected for a frequency profile characteristic of a bubble-pulse. Signal data identified as having a frequency profile characteristic of a bubble-pulse is identified as an excitation signal (630) and thus the anomaly (900).

The processing device (620) further determines a location of the anomaly (900) in the conduit (1000) based on the known positions of the shock wave generator (100) and the detector (610) and the known speed of the shock wave signal in the fluid medium, i.e., 1,500 m·s$^{-1}$. The location is determined based on these known inputs and the time measured between the introduction of the shock wave signal and detection of the excitation signal (630).

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The following is an example of an application of the invention. It is not to be construed as limiting the scope of the invention in any way.

Example 1—Leak Detection Testing

A test rig including at least one shock wave signal generator and at least one detector as a single unit according to the present invention was coupled to a utility water line via a hydrant stand pipe at hydrant RHY49568 in Moggill, Queensland, Australia.

The at least one detector comprised a hydrophone (Burns Electronics, CR30-40) with a 40 dB gain.

The at least one shock wave signal generator comprised an aluminium resonator, a striker and a mechanical actuating mechanism and trigger mechanism for striking the resonator with the striker upon receiving a trigger signal.

A datalogger was plugged into the test rig. The datalogger interfaced with the hydrophone and the trigger mechanism in order to simultaneously introduce the at least one shock wave signal and commence data collection.

Upon triggering of the at least one shock wave signal, data was collected by the datalogger via the hydrophone for a 10 second period. The data collected corresponds to a 7,500 m range.

FIG. 11A shows a plot of the signal data collected at the site.

The signal data was analysed for points of interest, and, as shown in FIGS. 11B and 11C, tees (T) and intersections (I) along the utility water line were identified.

Figure 12:
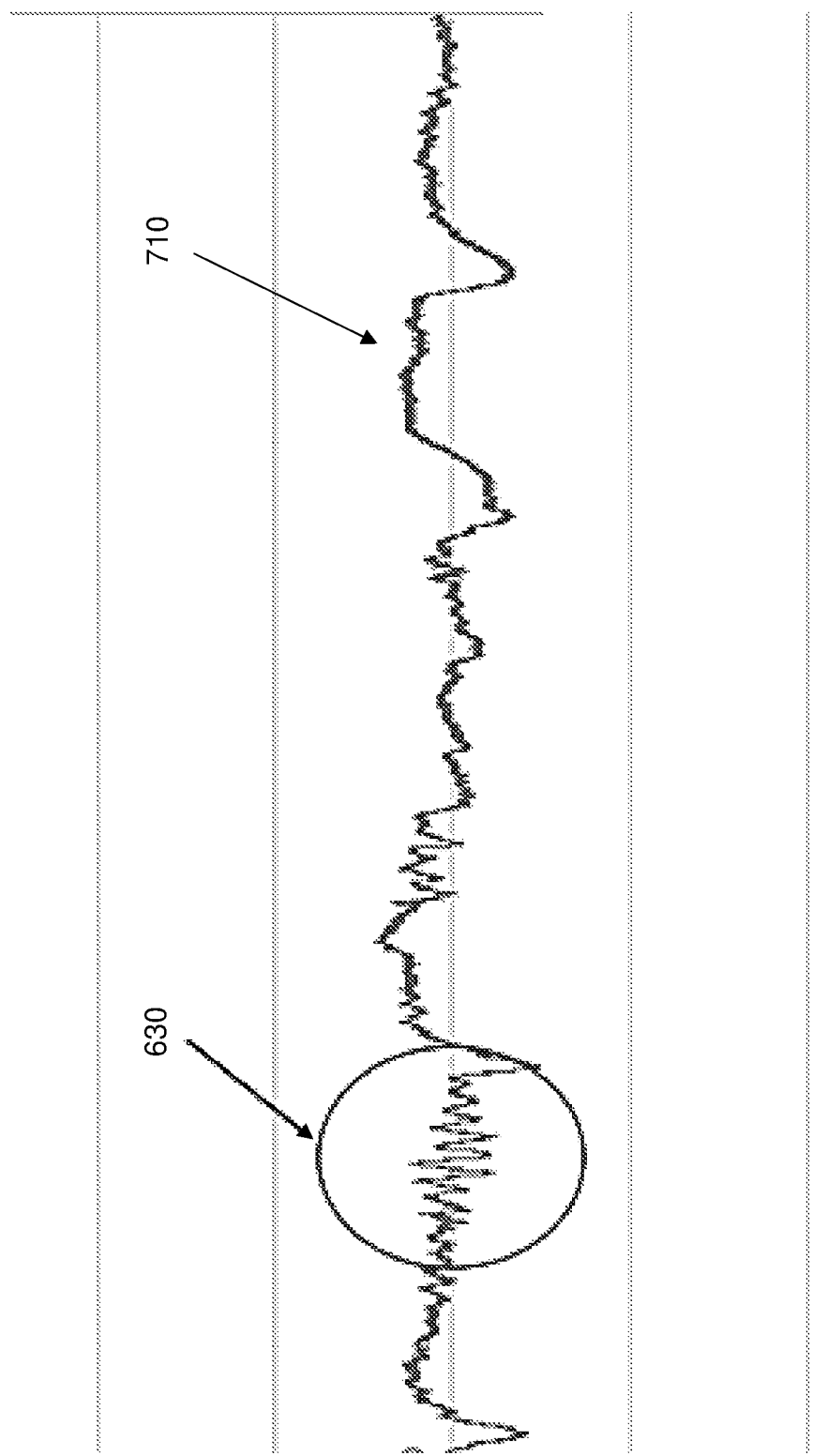
FIG. 12 is another magnified portion of the plot shown in FIG. 11A identifying a leak.

As shown in FIG. 12, analysis of the signal data identified a leak as indicated by a frequency profile (710) characteristic of a bubble-pulse frequency (630). The location of the leak was then calculated from the reading number relative to the count at the initiation of the strike of the resonator by the striker.

Figure 13:
FIG. 13 is an overlay of a map of the test site with the plot of the signal data as shown in FIG. 11A with the points of interest and leak identified in the FIGS. 11B, 11C and 12 marked.

As shown in FIG. 13, the points of interest and the leak site were then validated by overlaying a map of the test site with the signal data. The tees and intersections are marked (T) and (I) respectively and the leak site is marked (L).

The invention claimed is:

1. A shock wave signal generator for introducing a shock wave signal into a conduit containing a liquid fluid medium, said generator comprising:
    a striker; and
    a resonator operatively associated with the liquid fluid medium, said resonator configured to resonate when struck by the striker and emit a supersonic pulse that introduces at least one said shock wave signal into the liquid fluid medium.

2. The generator of claim 1, wherein the resonator is formed from a material or materials capable of emitting the supersonic pulse relative to the liquid fluid medium when at least partially compressed or struck and forming the shock wave signal at an interface of the liquid fluid medium.

3. The generator of claim 1, wherein the resonator is formed from high density polyethylene.

4. The generator of claim 1, wherein the resonator is formed from aluminium, titanium or beryllium.

5. The generator of claim 1, wherein the resonator has a cylindrical shape.

6. The generator of claim 1, further comprising a body for at least partially housing the resonator and the striker.

7. The generator of claim 6, wherein the body is connectable to the conduit such that the resonator is in fluid communication with the liquid fluid medium in the conduit.

8. The generator of claim 7, wherein the resonator is received in a bore in the body and an outer end of the resonator at least partially protrudes outwards from an outer wall of the body.

9. The generator of claim 1, wherein the striker is part of a striking mechanism comprising an actuating mechanism for moving the striker between a striking position in which it strikes the resonator and a retracted position.

10. The generator of claim 9, wherein the actuating mechanism is selected from a group consisting of an electromechanical solenoid, a magneto strictive arrangement, an electro strictive arrangement and a pneumatic arrangement.

11. The generator of claim 1, wherein the striker is selected from the group consisting of a hammer, a plunger and a piston.

12. An anomaly detection system for detecting an anomaly in a conduit containing a liquid fluid medium, said system comprising:
    at least one shock wave signal generator for introducing a shock wave signal into the conduit, said generator comprising:
        a striker; and
        a resonator operatively associated with the liquid fluid medium, said resonator configured to resonate when struck by the striker and emit a supersonic pulse that introduces at least one said shock wave signal into the liquid fluid medium;
    at least one detector for detecting signals in the liquid fluid medium; and
    at least one processor configured to identify excitation signals in the liquid fluid medium caused by said at least one shock wave signal, wherein identification of said excitation signals is indicative of the anomaly.

13. The system of claim 12, wherein the anomaly comprises a solid object, a blockage, an abnormal formation or a break in the conduit containing the liquid fluid medium.

14. The system of claim 12, wherein the at least one detector is a directional hydrophone.

15. The system of claim 12, wherein the at least one shock wave generator and the at least one detector are a single unit located on one side of an anomaly site in the conduit.

16. The system of claim 12, wherein the at least one shock wave signal generator and the at least one detector are located on opposite sides of an anomaly site in the conduit.

17. The system of claim 12, wherein the signals detected include signals corresponding to sound waves and pressure waves in the liquid fluid medium.

18. The system of claim 12, wherein the at least one shock wave signal introduced travels through the liquid fluid medium causing any anomaly to resonate and create a bubble pulse at a site of the anomaly.

19. The system of claim 18, wherein the identification includes analysing signal data detected and collected by the at least one detector and identifying signals having a characteristic frequency profile of the bubble-pulse having a series of peaks of amplitude and duration as a function of time.

20. A method of detecting an anomaly in a liquid fluid medium, said method comprising:
- introducing at least one shock wave signal into the liquid fluid medium with a shock wave signal generator comprising:
  - a striker; and
  - a resonator operatively associated with the liquid fluid medium, said resonator configured to resonate when struck by the striker and emit a supersonic pulse that introduces at least one said shock wave signal into the liquid fluid medium;
- sensing one or more parameters of the liquid fluid medium subject to the shock wave signal; and
- identifying one or more excitation signals caused by the shock wave signal in the one or more parameters sensed to identify the anomaly.

* * * * *